United States Patent [19]

Bühler

[11] Patent Number: 5,242,555
[45] Date of Patent: Sep. 7, 1993

[54] METHOD OF MACHINING WORKPIECES BY WIRE ELECTROEROSION AND SECURING MACHINED ARTICLES

[75] Inventor: Ernst Bühler, Losone, Switzerland
[73] Assignee: AGIE, Losone, Switzerland
[21] Appl. No.: 887,611
[22] Filed: May 22, 1992
[30] Foreign Application Priority Data
May 23, 1991 [DE] Fed. Rep. of Germany ....... 4116868
[51] Int. Cl.⁵ .............................................. B23H 7/02
[52] U.S. Cl. ........................... 204/129.5; 204/129.55; 204/297 R; 219/69.12; 219/69.17
[58] Field of Search ............. 204/129.5, 129.1, 297 M, 204/297 R, 129.6, 129.55, 206; 219/69.12, 69.17

[56] References Cited

U.S. PATENT DOCUMENTS

| | | | |
|---|---|---|---|
| 3,330,754 | 7/1967 | Trager | 204/129.55 X |
| 4,484,052 | 11/1984 | Inoue | 219/69.17 |
| 4,544,819 | 1/1985 | Nomura et al. | 219/69.17 |
| 4,575,603 | 3/1986 | Inoue et al. | 204/129.6 X |
| 4,661,678 | 4/1987 | Wavre | 219/69.12 |
| 4,746,782 | 5/1988 | Weber | 204/129.1 X |
| 4,820,894 | 4/1989 | Francois et al. | 219/69.12 |

FOREIGN PATENT DOCUMENTS

| | | |
|---|---|---|
| 3509418 | 9/1986 | Fed. Rep. of Germany . |
| 3641701 | 6/1987 | Fed. Rep. of Germany . |
| 61-109617 | 5/1986 | Japan . |
| 61-219528 | 9/1986 | Japan . |
| 1-321123 | 12/1989 | Japan . |
| 2-109639 | 4/1990 | Japan . |
| 2-224923 | 9/1990 | Japan . |
| 559599 | 3/1975 | Switzerland . |

*Primary Examiner*—Donald R. Valentine
*Attorney, Agent, or Firm*—EGLI International

[57] ABSTRACT

A method of machining workpieces, particularly for wire electroerosion machining in which a machining gap is formed between the machined piece and the workpiece, a machined piece is cut out of the workpiece, and the machined piece is secured against dropping out, whereby the machined piece is secured by at least one separate securing means arranged in the machining gap. The securing means is preferably cut out of the workpiece by electro-erosion (FIG. 1).

15 Claims, 4 Drawing Sheets

METHOD OF MACHINING WORKPIECES BY WIRE ELECTROEROSION AND SECURING MACHINED ARTICLES

BACKGROUND OF THE INVENTION

The present invention relates to a method for the machining of workpieces, particularly for electroerosion machining of workpieces by means of a wire, in which a working gap is formed between machined article and workpiece, a machined article is cut from the workpiece and the machined article is secured. The invention also refers to an electroerosion cutting device and to securing means for securing machined pieces after machining.

The securing of the machined piece comprises drop-out securing, centering securing, conductivity securing of drop-out pieces of machined dies, and further drop-out centering securing as well as the conductivity securing the production of the machining of tools.

FIELD OF THE INVENTION

Due to the increasing demands of the precision and automation of electroerosion, the securing of the machined parts require constant further development and optimizing.

In this connection, the securing of machined part is subject to the following limitations:

Between the workpiece and the machined piece, an electric circuit must exist during the drop-out or centering securing, so that the inner machined piece can be completely machined (conductivity securing). The electric circuit should be as simple as possible, which is difficult in the case of workpieces which have already been cut out completely. Thus, it is customary to hold a machined piece by gluing and also to create an electric connection between the machined piece and the workpiece.

Further, the machined piece should not shift due to the securing, i.e., a rigid positioning of the machined piece must be assured (centering securing). Even further, it should be possible to remove the machined piece easily so that a die or tools formed by erosion is not damaged.

Of particular interest are securities for machined pieces which can be installed easily and cheaply (for instance, exclusively through software expansions).

SUMMARY OF THE INVENTION

The object of the invention is to simplify and improve the securing of the machined pieces.

This object is achieved by separate securing means arranged separately in the machining gap. The arrangement of the separate securing means in the machining gap secures the machined piece in simple fashion against displacement and dropping out, which results in precision machining. The securing is also suitable for conical workpieces, because it is independent of geometry of workpieces. Machined pieces, such as gear wheels, with complicated contours, can also be secured. The freedom of movement of the wire guide heads is not impaired.

One particular advantage of the method of the invention is that it can be used in an uncomplicated manner with any machine and also without expansion of the machine. The separate securing means can either be inserted manually from the outside into the machining gap or the method is further automated.

With regard to the securing means for securing machined pieces the aforementioned goal is obtained in that at least one of the securing means is arranged separately in the machining gap. By "separately", it is understood that the securing means secure the machined piece in the workpiece by frictional and/or compressive forces. For the removal of the securing means, therefore, it is not necessary to break or cut any fixed connection of the workpiece between the securing means and the machined piece and/or the workpiece. A securing means is created so that the drop-out and centering of machined pieces is simplified and improved. In particular, the machined piece can be centered well in the machining gap by the securing means of the invention, so that the machining gap retains its predetermined width.

If an electroerosion cutting device is provided with a pressing tool as securing means, particularly a pressing mandrel, the method can be employed particularly effectively and easily. The securing means should not be pressed so strongly into the machining gap that the workpiece and/or the machined piece is distorted. The pressing mandrel permits a differentiated "pressing-in".

The basic concept of the invention consists therefore in the centering and firm pressing or holding of the machined piece in the worpiece by a separate securing means arranged possibly only in part within the machining gap. The method and the securing means for securing can be used for securing exclusive and/or additionally of drop-out, centering and/or for securing conductivity.

It is particularly preferred if the securing means are cut out of the workpiece or the machined piece. The securing means are thus separate from the machined piece and workpiece and can easily be adapted to the geometrical shape of the machining gap. The separation (i.e., cutting) of the securing means from the machined piece or from the workpiece makes the method equally suitable for the machining of dies and tools, because the securing means are cut in each instance from the other piece, i.e., for the die from the drop-out piece, and in the case of tools, from the remaining workpiece, which is not further used. At the same time, an electric contact is made between workpiece and machined piece since the securing means consist of conductive workpiece material. Because there is no need to use an additional other substance, the method does not increase the danger of corrosion. One particular advantage of the invention is that unsupervised machining of the workpiece is possible. Based on a predetermined algorithm, the machine can automatically calculate and cut out optimal points or surfaces of attachment of the workpiece contour. In this way, the erosion is further automated.

It is particularly preferred if the securing means are cut out by angular cutting movements of wire guides in the X/Y- or U/V-plane, i.e. the normal software of the machine need not be expanded by special cutting functions. It is possible to automate the method of the invention to such an extent that a computer determines the most favorable coordinates for the arrangement of the securing means (see above), but generally the contours of the securing means can also be introduced in traditional ways similar to a "normal" machined-piece contour to be produced by erosion.

The securing means are preferably arranged or cut out at diagonal places of the cutting contour, i.e., the contour of the machining gap. This way, the machined piece is centered free of canting by the arrangement of the securing means and the securing means in each case press from opposite points with equal force against the machined piece.

If the securing means has already been completely cut out from the workpiece, and prevented from dropping into the machining gap by a mounting device or a magnet until its use, the securing means can be precut already during the first partcut, or at least before the fine or finish machining, without impairing freedom of movement of the electric erosion wire. The machining gap remains fully accessible to the electricerosion wire with respect to further finish cuts. The same applies for a machining utilizing securing securing means that are precut except for a remaining connection, during a machining stage in which the machined piece is still connected by a web to the workpiece, and is separated upon needed from the rest of the workpiece.

A cutting of still existing connections between the workpiece and the machined piece by erosion during the use of the securing means permits a burr-free machining of the machined piece. A non-erosive subsequent machining of a residual burr which has remained is unnecessary.

While using the securing means, the electric connection between the machined piece and the workpiece is preferably improved, or exclusively produced, by the securing means so that the machined piece can be machined further without problem.

If the securing means is so cut out of the workpiece that at least one area of the securing means adjoins the machining gap so that after a complete separation of its connecting surfaces to the workpiece or machined piece the securing means drops into the machining gap, then no further measures are necessary for the insertion of the securing means into the machining gap.

The securing means for the removing of the machined piece after the completion of the machining of the workpiece is preferably relieved from load by turning the workpiece without the contours of the workpiece or the machined piece being damaged.

Good adherence with simple cutting geometry result if workpiece sections of wedge shape are used as securing means.

If the tip of the securing means pointing into the machining gap is cut at a more acute angle with increasing height of the workpiece, one can operate with a saving of material, in particular upon the cutting of several machined pieces out of a workpiece.

Particular great adherence and good electrical conductive connection between workpiece and machined piece are obtained if the securing means is pressed into the machining gap by a tool, for instance a press mandrel. A separate press-mandrel device is unnecessary when the securing means is pressed into the machining gap by a starting bore hole device. The particular centering action of the method is used if, during the use of the securing means, an opposing force from below and/or some other method of securing additionally supports the securing against drop-out.

Complete automation of the method of the invention is obtained by the particularly preferred additional step. Here, the arrangement and the geometry of the securing means of the invention of the workpiece are automatically determined by suitable control software. The operator is then optimally relieved of work.

The particularly preferred wedge-machined development of the securing means permits an uncomplicated arrangement and pressing of the securing means of the invention into the machining gap.

A machine needs not be expanded if the starting bore hole device provided with a pressing mandrel is used as the pressing tool.

Other preferred features of the invention will become evident from the following description of preferred embodiments. These embodiments are shown diagrammatically in the accompanying drawing in which the difference between devices according to the invention and the above-described prior art are also shown.

In the following, a terminology is used which serves for easier reading of the specification but is not to be understood in a limiting manner. For example, the expressions top, bottom, larger, smaller, etc. refer to workpieces on machines in ordinary operating position and of ordinary size, as well as to workpieces and machined pieces arranged in customary manner on a machine table. By the expressions "wedge-machined securing means" and "wedge", there are covered various geometrical bodies which have the feature in common that they have a base surface and a section tapering the body preferably to an edge or a point-machined corner. This definition, as customary, includes pyramids but, within the meaning of the invention "wedge", it also includes tetrahedrons (longitudinally cut) cones, quarter spheres, obliquely cut cubes, and circular cylinders, as well as various irregular geometrical bodies which are adapted to the contour of the machined piece and have a tapering section.

DETAILED DESCRIPTION OF THE DRAWINGS

Figure 1:
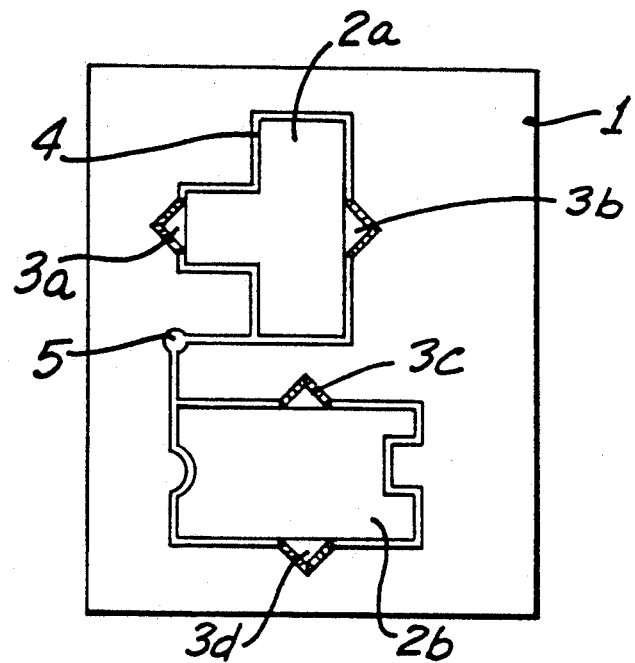
FIG. 1 is a top view of two machined pieces which have already been cut out completely and which are secured from dropping out in a workpiece by the method of the invention.

The possibilities of the method of the invention are particularly evident in FIG. 1. A workpiece 1 having two machined pieces—two tools— 2a, 2b which have already been completely cut out is secured against dropping out by securing means of wedges 3a, 3b, 3c, 3d. The wedges 3a, 3b, 3c, 3d are arranged in a machining gap 4 between the workpiece 1 and the cut-out machined pieces 2a and 2b. The wedges 3a, 3b, 3c, 3d clamp just sufficiently firmly in the machining gap 4 that they secure the workpieces 2a and 2b in several ways; that is against dropping out (drop-out securing) and, against displacement (centering securing). A bore hole 5 serves for the initial threading of the erosion wire (not shown).

It is particularly preferred for the wedges 3 to have a base surface which is arranged perpendicular to the machining gap 4 and an outer surface which is adapted to and faces a part of the surface of the machining gap 4. Furthermore, two outer surfaces are preferably arranged at an angle of 90° to each other. These two outer surfaces taper the wedge 3 in an acute angle in downward direction. They lie on two corresponding mating surfaces—upon the production of dies in the machined piece 2 and upon the production of tools in the remaining workpiece 1. These resting surfaces are indicated by hatchings in FIGS. 1, 2, 3, 4 and 7.

Figure 2A:
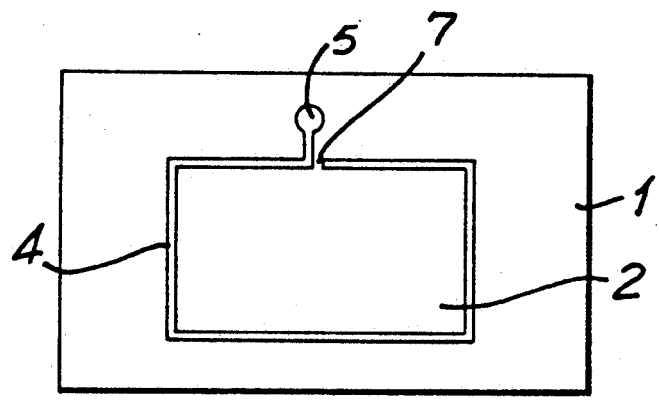
FIGS. 2A–2E show a workpiece from which a rectangular machined piece is to be cut out, shown in different successive stages of machining.
Figure 2B:
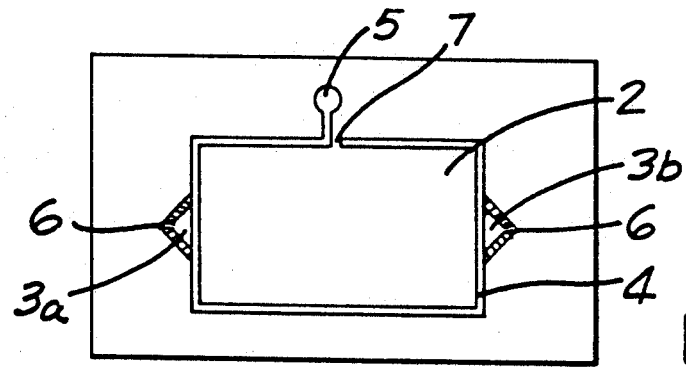
Figure 2C:
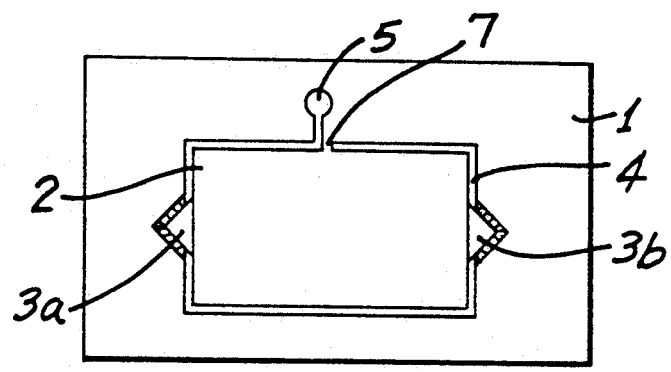
Figure 2D:
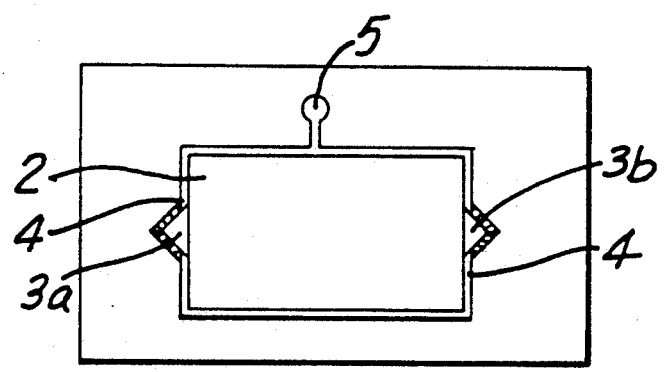
Figure 2E:
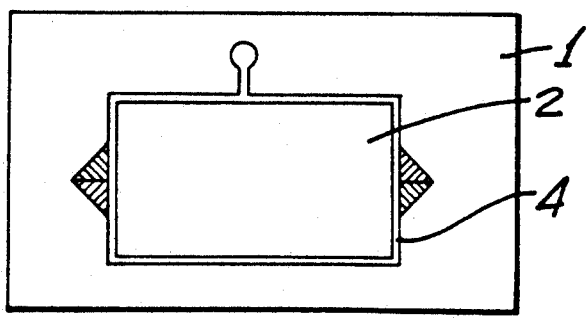

The method of the invention is carried out, preferably, in the manner described below (FIGS. 2A-2E):

After the threading of the erosion wire, the machined piece 2 is cut out, except for a remaining residual web 7 (full cut: FIG. 2A). The wedges 3a and 3b are then each precut by two angular cutting movements of the U/V- and/or X/Y-wire guide heads except for residual connections (or fixing points) 6 via which the wedges 3 are still fastened to the workpiece 1 (FIG. 2B). One of the cuts can also be extended laterally out of the workpiece. The workpiece 1 is now machined further, for instance by a finish cut. Following this, the discharge wire is moved against the remaining web 7. The remaining connections 6 are cut (FIG. 2c) preferably with a press tool such as, for instance, a press mandrel 8. The remaining connections 6 can also be cut through. The wedges 3a and 3b are pressed by the press mandrel 8 sufficiently firmly into the machining gap 4 that the friction or pressure between the workpiece 1 and machined piece 2 locks the machined piece 2 against its effort to drop within the workpiece 1. Thereupon, the remaining residual web 7 is cut by erosion and possibly subjected to finish cutting (FIG. 2d). After the cutting process, the workpiece 1 is relieved from load by rotation, and the wedges 3a, 3b can easily be removed together with the machined piece 2 (FIG. 2a).

One great advantage of the drop-out securing of the invention resides in the possibility of supplementing known methods of securing. One of these methods consists therein that, upon the cutting of a machined piece 2, a web 7 connecting with the workpiece 1 is left, it having to be broken off after the completion of the cutting process. The breaking off of the connecting web 7 leaves a burr which, in the case of machined pieces 2 are to be cut with high precision, may make finish machining, for instance a final filing, necessary. Possibly a final working may not be necessary at all, or only with great difficulty. Upon a combination with the method of the invention, the final machining is replaced by an erosion cut. The machined piece 2 is machined completely by erosion without any disturbing burr being produced.

Figure 3:
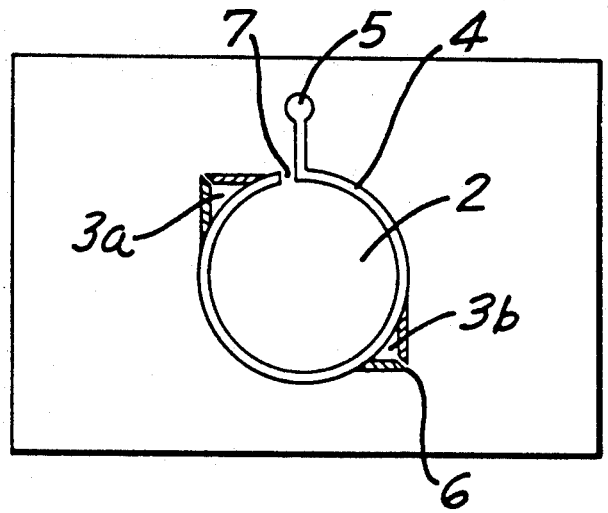
FIG. 3 is a top view of a cylindrical tool which has not yet been completely cut out, having securing means in wedge shape in accordance with the invention prepared for securing against dropping out.

In FIG. 3, the special feature that the drop-out securing securing means 3 are utilized, by the cutting out to the geometry of machined piece 2 and workpiece 1 is illustrated by a machined piece 2 having a cylindrical surface. The side of the wedges 3a and 3b facing the machining gap has an indentation which is adapted to the cylindrical outer contour of the machined piece. The wedges 3a, 3b have already been precut, but the small-surface residual connections 6 between the wedges 3a, 3b and the workpiece 1 still remain and prevent a lowering of the wedges 3a, 3b into the machining gap 4. The machined piece 2 is still attached to the workpiece 1 by the remaining web 7. If no remaining connections 6 are left upon the cutting of the wedges 3, it is conceivable to prevent the wedges 3 by a magnet (not shown) from dropping into the machining gap until their use.

FIGS. 1, 2, 3 and 4 show the suitability of the method of the invention for the most different contours of the machined piece to be cut. FIG. 1 illustrates that, with suitable size of the securing means 3, several machined pieces 2 can be cut from a workpiece 1 without impairing the freedom of movement of the wire guide heads. In FIG. 3, there is shown the machining of a cylindrical machined piece 2 and in FIG. 4 the cutting of a die of complicated shape. The surfaces of the at least one wedge 3 which face the machining gap 4 are always adapted to the adjoining outer surfaces of the machined piece 2 and of the workpiece 1 (by the production of the wedges 3 by erosion parting steps). In this way, maximum adherence is obtained between machined piece 2 and workpiece 1. This adherence also improves the electrical contact between machined piece 2 and workpiece 1, for instance upon final erosion of the remaining web 7.

Upon the machining of a die (FIG. 4), the method of the invention is employed in similar fashion. The main difference from FIGS. 1 and 2 is that the securing means are cut out of the precut shape or drop-out piece and not out of the remaining workpiece 1. The wedge 3c, in addition, has the feature that it has four friction surfaces—three towards the machined piece and one towards the die—which additionally improves the adherence. The feature that the securing means of the invention can be cut and arranged differently depending on the geometry of the workpiece is shown clearly in FIG. 4. The wedges 3 are preferably so arranged opposite each other in the workpiece 1 that the machined piece 2 "is balanced" and is not pressed by lateral forces of rotation into the cut contours 4. Diagonal places of the cut contour 4 are particularly suitable for the arrangement of the securing means 3 of the invention.

The preferred wedge shape of the securing means 3 of the invention results from the combination of the already sufficient adherence action and the simple manufacture by securing means of only a few cuts.

The cutting out of the wedges 3 is preferably effected as follows (see FIG. 7):

The erosion wire is inclined by the angle $\beta$ in order to cut out a wedge 3 in the machining gap 4. The wire is then guided at an angle of 45° with the plane of the machining gap into the workpiece 1 in such a manner as to form a cut contour A. By a suitable "opposite" cut, a cut contour B is formed. The contours A and B thus intersect at an angle of 90°. The cuts are preferably so made that the remaining connection 6 is retained.

Conically cut wedges 3 or wedges 3 having more than three or four outer surfaces lying in the machining gap 4 are also conceivable. The adherence action in that case increases with the size of the friction surfaces.

Figure 5:
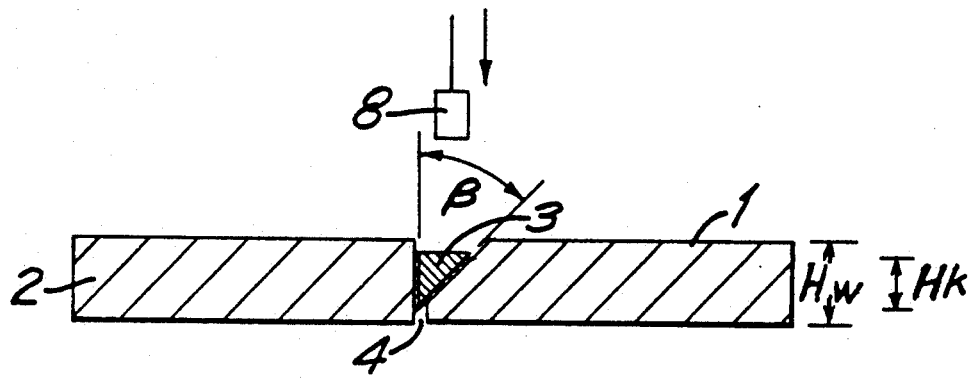
FIG. 5 is a section through a workpiece in which a machined piece is secured by a wedge in accordance with the method of the invention.

FIG. 5 shows the preferred shape of the wedges 3 of the invention, based on a sectional view. The wedge 3 is pressed into the machining gap 4 by the pressing tool 8. This is additionally shown by an arrow. The press mandrel 8 can preferably be a corresponding insert for the starting bore hole machine.

Figure 6:
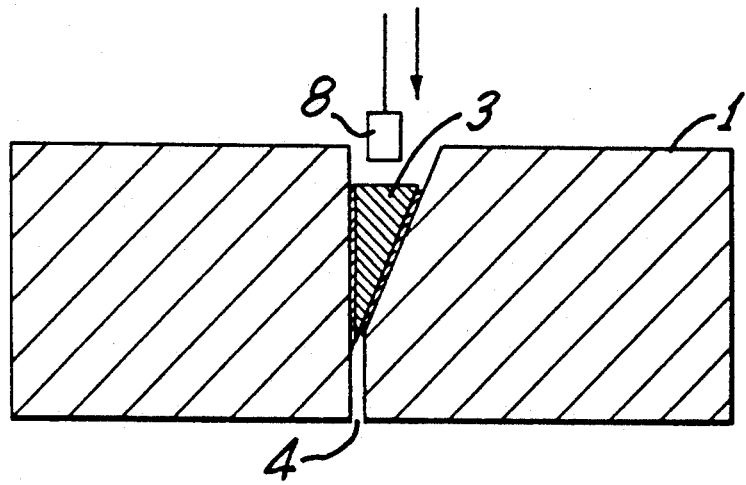
FIG. 6 is a section through a higher workpiece as compared with FIG. 5, in which a machined piece is secured by a wedge in accordance with the method of the invention.

The optimal size of an angle $\beta$ of the tip of the wedge 3 pointing into the machining gap 4 is a function of the workpiece height Hw and the wedge height Hk, as can be noted from a comparison with FIG. 6, which is drawn on the same scale. The workpiece height Hw is defined as the distance between the lower and upper planes of the workpiece 1, and the wedge height Hk is defined as the distance between the base surface and the opposite acute-angle corner of the wedge 3.

With decreasing height Hw of the workpiece, for constant wedge height Hk, the angle $\beta$ can be increased (or conversely, with a smaller angle $\beta$ the wedge 3 can be less strongly wedged), since the lateral force acting on the machined piece 2 decreases with increasing angular size $\beta$ under constant pressing force of insertion. The wedging should only be sufficiently firm that no stresses and strains are produced in the workpiece 1 and in the machined piece 2. The function has further variables; for instance, the coefficient of friction as well as the weight of the machined piece and the specific weight of the material. Wedges 3 the depth Hk of which corresponds to the workpiece height Hw are, for instance, also conceivable.

The wedges 3 of the invention need not be cut out of the workpiece 1; it is also possible to use prefabricated wedges which are inserted or pressed by a corresponding device such as a magnet (not shown) into the machining gap 4 which has been preferably eroded in a manner adapted to the wedge shape. If the wedges 3 are pressed sufficiently strongly, it is even conceivable to insert them from the bottom into the machining gap 4.

Figure 7:
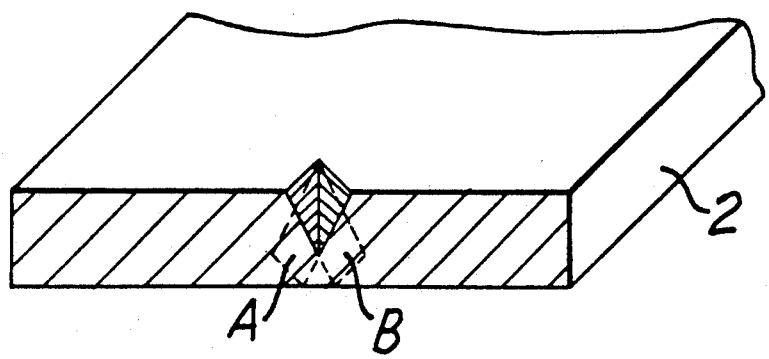
FIG. 7 is a view of the contour of a machining gap of a section of a workpiece from which a wedge in accordance with the invention has been cut out.

FIG. 7 shows a section of a workpiece or drop-out piece 2 from which a wedge in accordance with the invention has been cut. On the front edge (cut gap edge) there are indicated—in dotted lines—the two cuts A and B necessary to produce the wedge 3. It can also be readily recognized that while the cuts A and B cut the wedge 3 out, a lower section 9 present between the cut surfaces A and B can, however, not drop out.

The method of the invention can be supplemented and refined by different variants and method steps. Thus, the wedges 3 of the invention can be precut already during the first full cut. The holding of the wedges 3 until their use can be effected by a magnet. Furthermore, the use of the wedges 3 in accordance with the invention can be combined with traditional anti-dropout methods: For example, the workpiece 1 and/or the machined piece 2 can be held additionally from below. One essential function of the wedges 3 of the invention resides then in the centering securing of the machined piece 2. The pure "holding" can possibly be effected completely by other methods and only the centering and/or conduction securing of the wedges 3 of the invention utilized.

Figure 4:
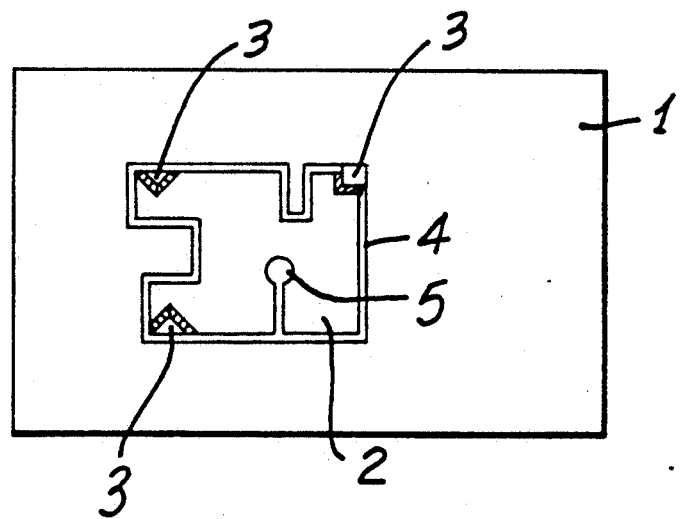
FIG. 4 is a top view of a completely cut-out die in which a drop-out piece is secured by the securing means of the invention.

The method of the invention is not limited to "vertically" downward extending machining gaps 4—see FIGS. 4 and 5. If the wedges 3 are pressed firmly enough into the machining gap 4, the method can also be used with obliquely extending machining gaps 4. For example, the wedges 3 can also be used to center within the machining gap a conical machined piece 2, having a correspondingly conically extending machining gap 4 and secured against dropping out by its shape, in such a manner that, upon the cutting through of the remaining connection 7, it does not descend into the machining gap and block the gap 4.

I claim:

1. A method of machining workpieces, in particular for wire electroerosion machining of workpieces comprising the steps of
    forming a machining gap between a machined piece and a workpiece,
    cutting out the machined piece of the workpiece, and
    securing the machined piece by at least one separate securing means arranged in the machining gap, the separate securing means being separated from one of the workpiece and the machined piece.

2. The method of claim 1, wherein the separate securing means is cut out by angular cutting movements of wire guides in the X/Y- or U/V-plane.

3. The method of claim 1, wherein the separate securing means is arranged or cut out at diagonal places of the cut contour.

4. The method of claim 1, wherein the separate securing means is cut out completely from the workpiece already prior to its use, and is prevented from sinking into the machining gap until the time of its use by one of a mounting device and a magnet.

5. The method of claim 1, wherein during one stage of the machining in which the machined piece is still connected to the workpiece by a web, the separate securing means is precut except for a remaining connection, and when needed, is separated from the rest of the workpiece.

6. The method of claim 1, wherein during the use of the separate securing means, still existing connections between the workpiece and the machined piece are cut through via erosion and finish-machined.

7. The method of claim 1, wherein during the use of the separate securing means, the electric connection between the machined piece and the workpiece is one of improved and produced in its entirety by the separate securing means.

8. The method of claim 1, wherein the separate securing means is so cut out of the workpiece that at least one surface of the separate securing means adjoins the machining gap so that after a complete separation of the surfaces connecting the separate securing means to the workpiece or machined piece, the separate securing means drops into the machining gap.

9. The method of claim 1, wherein after the completion of the machining of the workpiece, the separate securing means is relieved from load by turning the workpiece.

10. The method of claim 1, wherein the separate securing means includes wedge-shaped workpiece sections.

11. The method of claim 10, wherein a corner of the separate securing means pointing into the machining gap is cut at an increasingly acute angle with increasing height of the workpiece.

12. The method of claim 1, wherein the separate securing means is pressed into the machining gap by a tool.

13. The method of claim 1, wherein the separate securing means is pressed by a starting bore hole device into the machining gap.

14. The method of claim 1, including, during the use of the separate means, providing at least one of an opposing force from the bottom and another method of securing for supplementing the securing of the machined piece.

15. The method of claim 1, wherein arrangement and geometry of the separate securing means in the workpiece are automatically determined by suitable control software.

* * * * *